(12) United States Patent
Hagimori et al.

(10) Patent No.: US 6,853,807 B2
(45) Date of Patent: Feb. 8, 2005

(54) IMAGING DEVICE AND DIGITAL CAMERA USING THE IMAGING DEVICE

(75) Inventors: Hitoshi Hagimori, Ikoma-Gun (JP); Yasushi Yamamoto, Shanghai (CN); Genta Yagyu, Amagasaki (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/610,088

(22) Filed: Jun. 30, 2003

(65) Prior Publication Data

US 2004/0062535 A1 Apr. 1, 2004

(30) Foreign Application Priority Data

Jul. 4, 2002 (JP) ........................................ 2002-196170

(51) Int. Cl.[7] .............................. G03B 5/00; G02B 15/14
(52) U.S. Cl. ...................... 396/72; 396/351; 359/689; 348/240.3
(58) Field of Search ........................... 396/72, 79, 351; 359/676, 684, 686, 689, 691; 348/240.3, 360

(56) References Cited

U.S. PATENT DOCUMENTS

| 5,448,319 | A | 9/1995 | Uzawa .......................... 354/81 |
| 6,104,432 | A | 8/2000 | Nakamura et al. ........... 348/360 |
| 6,339,508 | B1 * | 1/2002 | Nozawa et al. .............. 359/686 |
| 2001/0038496 | A1 * | 11/2001 | Yamamoto et al. .......... 359/689 |
| 2002/0136150 | A1 | 9/2002 | Mihara et al. ............... 369/125 |
| 2003/0179464 | A1 * | 9/2003 | Amanai ....................... 359/685 |
| 2003/0193722 | A1 * | 10/2003 | Mihara ........................ 359/684 |

FOREIGN PATENT DOCUMENTS

| EP | 0 906 587 B1 | 9/2002 |
| JP | 08-248318 A | 9/1996 |
| JP | 11-196303 A | 7/1999 |
| JP | 11-258678 A | 9/1999 |
| JP | 2000-131610 A | 5/2000 |

OTHER PUBLICATIONS

U.S. Appl. No. 10/325,271, filed Dec. 20, 2002, Hagimori et al.
U.S. Appl. No. 10/390,360, filed Mar. 17, 2003, Iwasawa et al.

* cited by examiner

Primary Examiner—W. B. Perkey
(74) Attorney, Agent, or Firm—Sidley Austin Brown & Wood LLP

(57) ABSTRACT

An imaging device has a zoom lens system having a plurality of lens units and forming an optical image of an object so as to continuously optically zoom by varying distances between the lens unit; and an image sensor converting the optical image formed by the zoom lens system to an electric signal. The zoom lens system comprises, from an object side. A first lens unit being overall negative and including a reflecting surface that bends a luminous flux substantially 90 degrees; and a second lens unit disposed with a variable air distance from the first lens unit, and having a negative optical power.

28 Claims, 9 Drawing Sheets

FNO=2.24

Spherical Abe. & S. C.

Y'=3.3

Astigmatism

Y'=3.3

Distortion %

FNO=2.98

Spherical Abe. & S. C.

Y'=3.3

Astigmatism

Y'=3.3

Distortion %

FNO=4.10

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.66

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

FNO=3.60

Spherical Abe. & S. C.

Y'=3.3

Astigmatism

Y'=3.3

Distortion %

IMAGING DEVICE AND DIGITAL CAMERA USING THE IMAGING DEVICE

RELATED APPLICATION

This application is based on application No. 2002-196170 filed in Japan on Jul. 4, 2002, the content of which is hereby incorporated by reference.

FIELD OF THE INVENTION

The present invention relates to an imaging device having an image sensor that converts, to electric signals, optical images formed on the light receiving surface of a charge coupled device (CCD), a complementary metal-oxide semiconductor (CMOS) sensor or the like, and more particularly, to an imaging device which is a principal element of cameras incorporated in or externally attached to digital cameras, personal computers, mobile computers, mobile telephones, personal digital assistances (PDAs) and the like. Specifically, the present invention relates to a compact imaging device having a zoom lens system.

DESCRIPTION OF THE PRIOR ART

In recent years, digital cameras have been rapidly becoming widespread that convert an optical image to electronic signals by using an image sensor such as a CCD or a CMOS sensor instead of silver halide film, convert the data to digital form, and record or transfer the digitized data. In such digital cameras, since CCDs and CMOS sensors having high pixels such as two million pixels and three million pixels are comparatively inexpensively provided recently, a high-performance imaging device mounted with an image sensor is in greatly increasing demand. In particular, a compact imaging device is desired that is provided with a zoom lens system capable of performing zooming without any image quality degradation.

Further, in recent years, imaging devices have been becoming incorporated in or externally attached to personal computers, mobile computers, mobile telephones, PDAs and the like because of improvements in the image processing capability of semiconductor elements and the like, which spurs the demand for a high-performance imaging device.

As zoom lens systems used for such imaging devices, so-called minus lead zoom lens systems in which the lens unit disposed on the most object side has a negative optical power are proposed in large numbers. Minus lead zoom lens systems have features such that they are easily made wide-angle and that the lens back focal length necessary for inserting an optical low-pass filter is easily secured.

Conventional examples of minus lead zoom lens systems include zoom lens systems proposed as taking lens systems for film-based cameras. However, in these zoom lens systems, since the exit pupil of the lens system in the shortest focal length condition is situated comparatively near the image plane, it does not match with the pupil of the microlens provided so as to correspond to each pixel of the image sensor having high pixels, so that a sufficient quantity of peripheral light cannot be secured. In addition, since the position of the exit pupil largely varies during zooming, the setting of the pupil of the microlens is difficult. Further, since required optical performance such as spatial frequency characteristics is completely different between silver halide film and image sensors to begin with, optical performance required of image sensors cannot be sufficiently secured. For these reasons, there has emerged a need for the development of a dedicated zoom lens system optimized for imaging devices having an image sensor.

On the other hand, to reduce the size of the imaging device, a proposal has been made to attain size reduction without any change in optical path length by bending the zoom lens system in the middle of the optical path. For example, Japanese Laid-Open Patent Application No. H11-196303 proposes an imaging device where in a minus lead zoom lens system, a reflecting surface is provided on the optical path and the optical path is bent substantially 90 degrees by the reflecting surface and then forms an optical image on the image sensor by way of movable lens units. The imaging device disclosed by this application has a structure that a reflecting surface is provided on the image side of a fixed lens element of a negative meniscus configuration and the optical path is bent substantially 90 degrees by the reflecting surface and then reaches the image sensor by way of two movable positive lens units and a fixed positive lens unit.

As another example, Japanese Laid-Open Patent Application No. H11-258678 discloses a structure that a reflecting surface is provided on the image side of a fixed lens element of a negative meniscus configuration and a movable positive lens unit and the optical path is bent substantially 90 degrees by the reflecting surface and then reaches the image sensor by way of a positive lens unit.

However, in these two applications, only the lens barrel structure is disclosed and no specific zoom lens system structure is shown. It is difficult to reduce the overall size of imaging devices having a zoom lens system unless the zoom lens system taking up the largest space in volume is optimized.

OBJECT AND SUMMARY

An object of the present invention is to provide an improved imaging device.

Another object of the present invention is to provide an imaging device being compact although having a high-performance and high-magnification zoom lens system.

The above-mentioned objects are attained by an imaging device having the following structure:

An imaging device comprising: a zoom lens system having a plurality of lens units and forming an optical image of an object so as to continuously optically zoom by varying distances between the lens unit; and an image sensor converting the optical image formed by the zoom lens system to an electric signal, wherein the zoom lens system comprises from an object side: a first lens unit being overall negative and including a reflecting surface that bends a luminous flux substantially 90 degrees; and a second lens unit disposed with a variable air distance from the first lens unit, and having a negative optical power.

Moreover, another aspect of the present invention is a digital camera including the above-described imaging device. While the term digital camera conventionally denotes cameras that record only optical still images, cameras that can handle moving images as well and home digital video cameras have also been proposed and at present, there is no distinction between cameras that record only still images and cameras that can handle moving images as well. Therefore, in the following description, the term digital camera includes all of the cameras such as digital still cameras and digital movie cameras where an imaging device having an image sensor that converts optical images formed on the light receiving surface of the image sensor to electric signals is a principal element.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
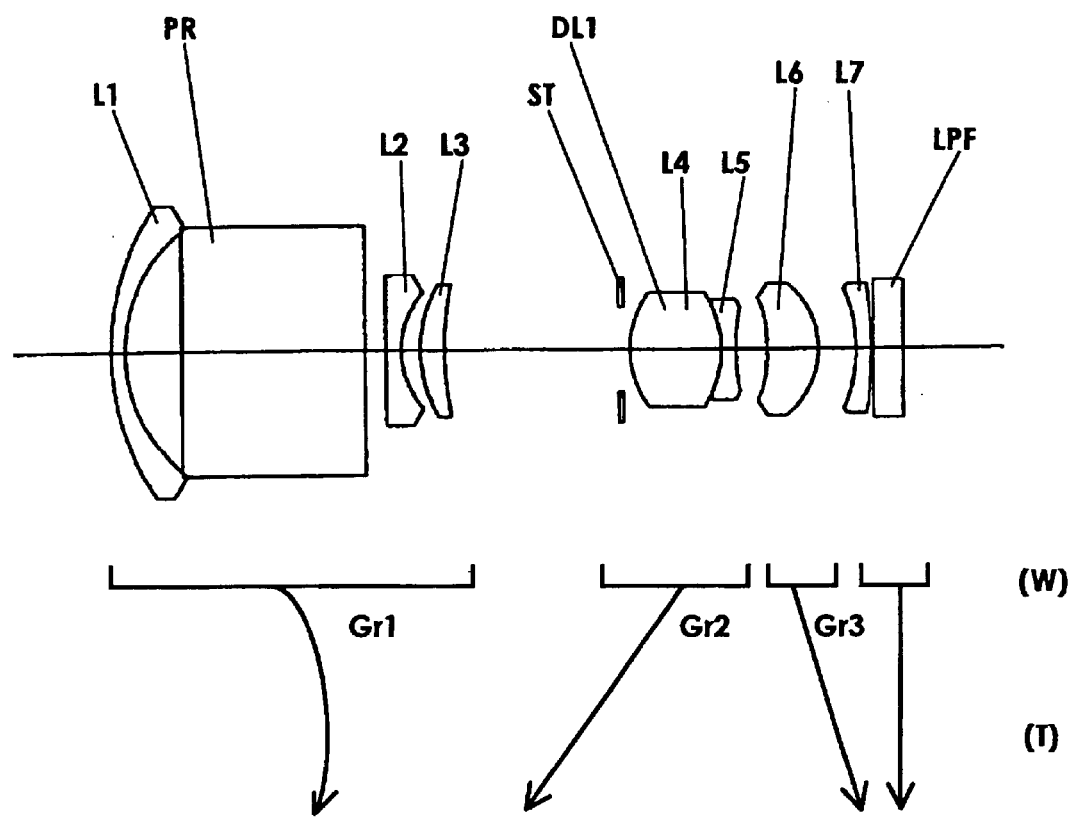
FIG. 1 is a lens construction view of a first embodiment (first example)
Figure 2:
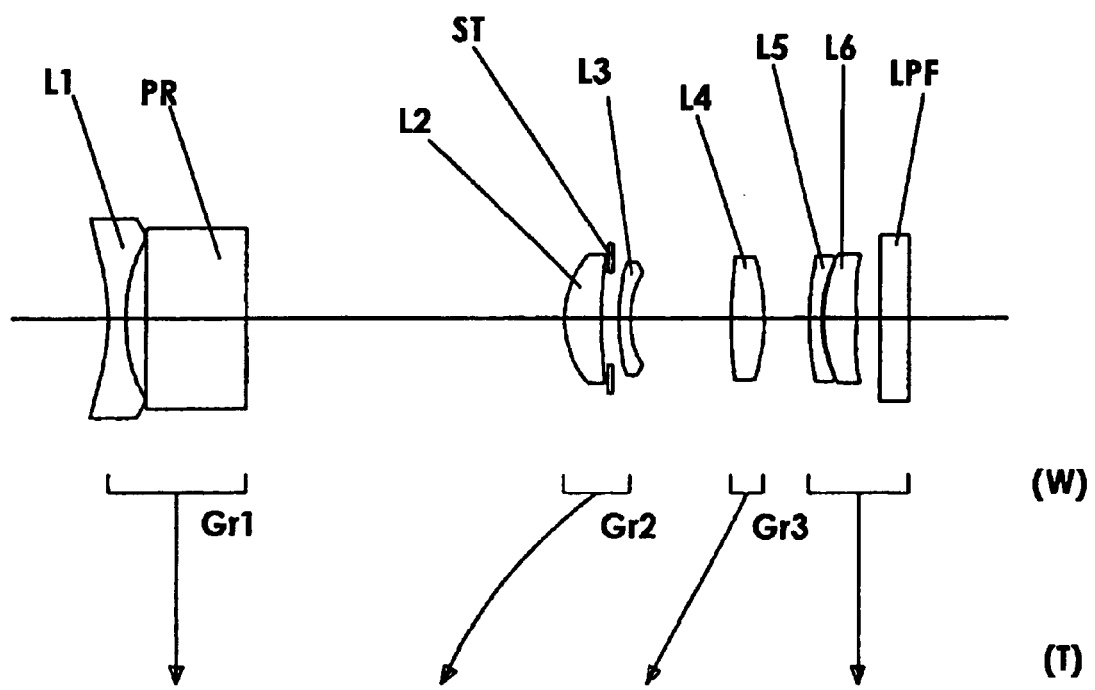
FIG. 2 is a lens construction view of a second embodiment (second example)
Figure 3:
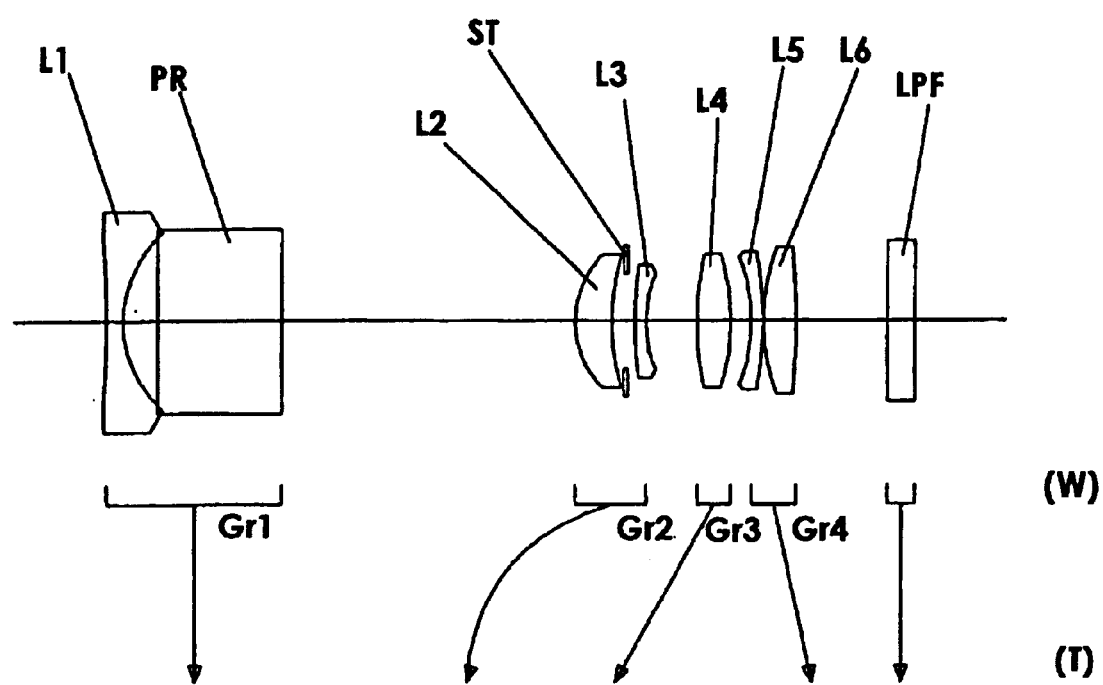
FIG. 3 is a lens construction view of a third embodiment (third example)
Figure 4:
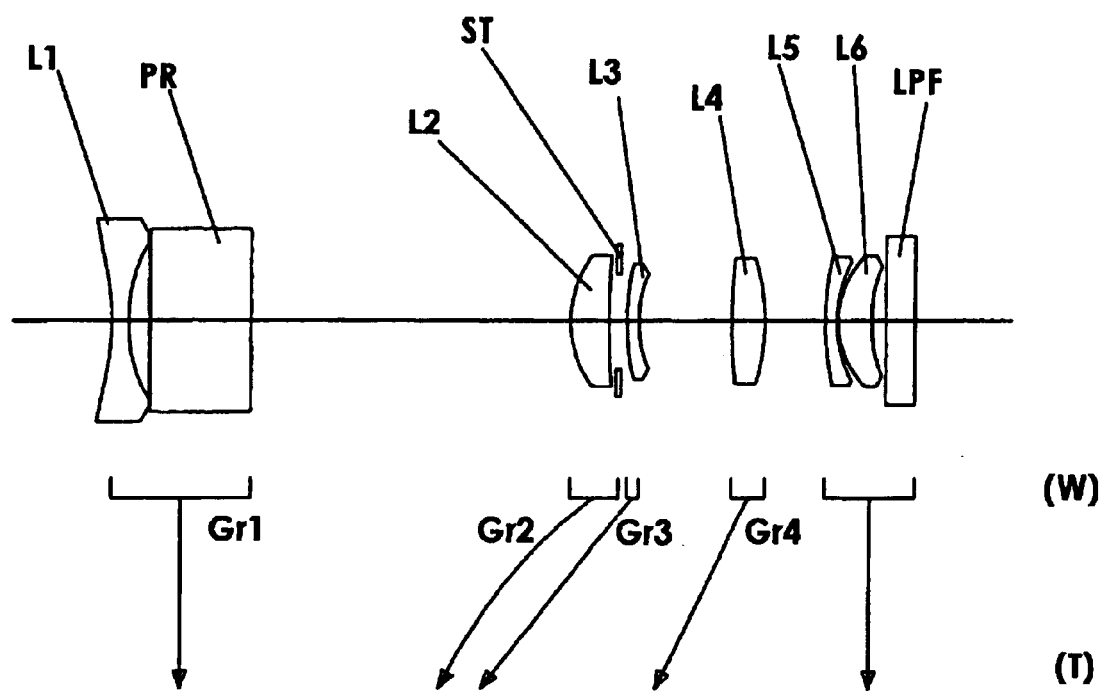
FIG. 4 is a lens construction view of a fourth embodiment (fourth example)
Figure 5A:
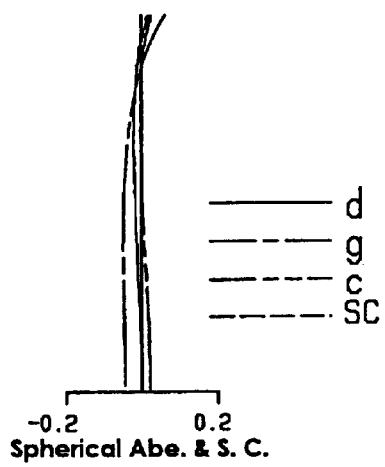
FIGS. 5A to 5I are graphic representations of aberrations of the first embodiment in in-focus state at infinity.
Figure 5B:
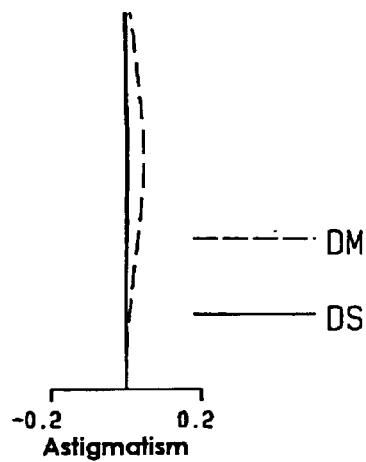
Figure 5C:
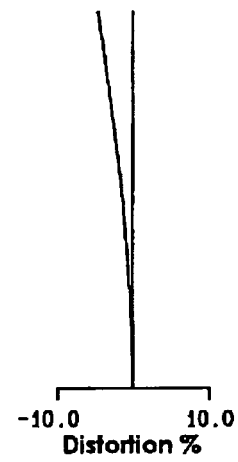
Figure 5D:
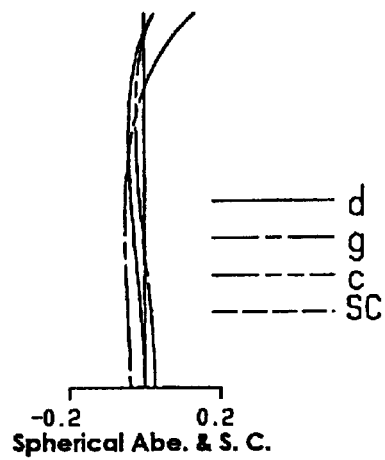
Figure 5E:
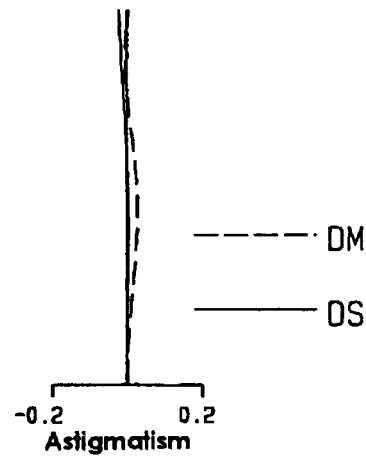
Figure 5F:
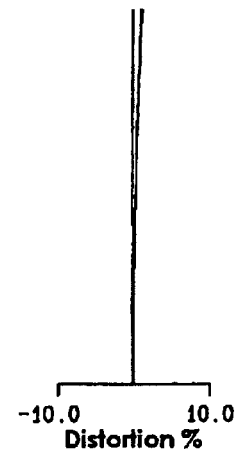
Figure 5G:
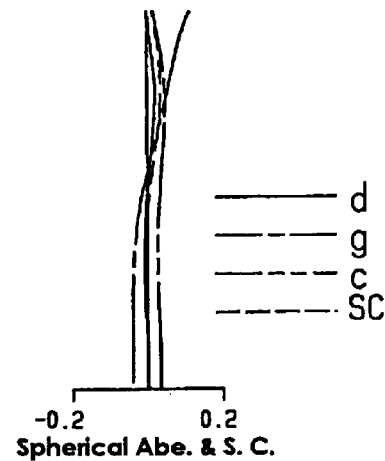
Figure 5H:
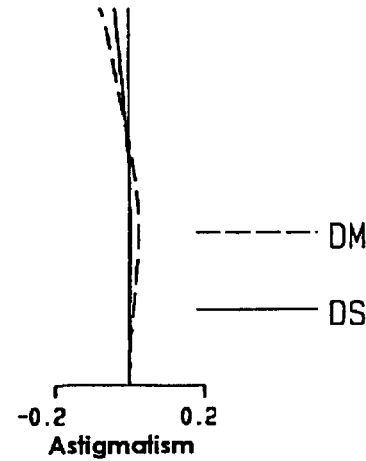
Figure 5I:
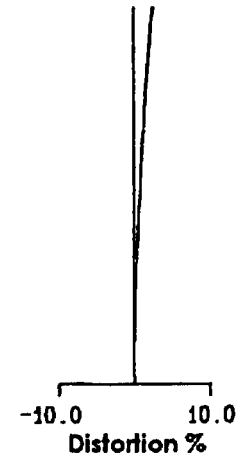
Figure 6A:
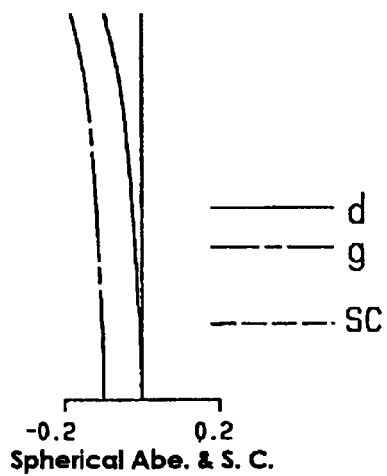
FIGS. 6A to 6I are graphic representations of aberrations of the second embodiment in in-focus state at infinity.
Figure 6B:
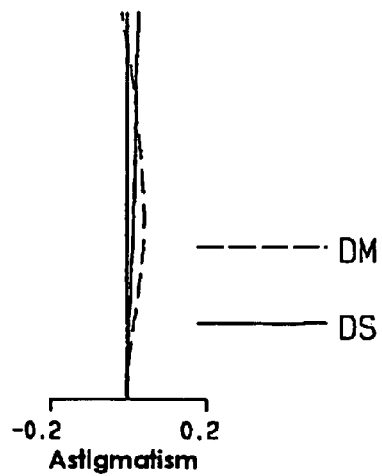
Figure 6C:
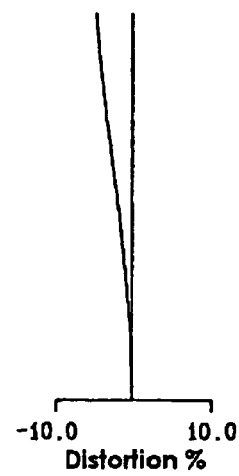
Figure 6D:
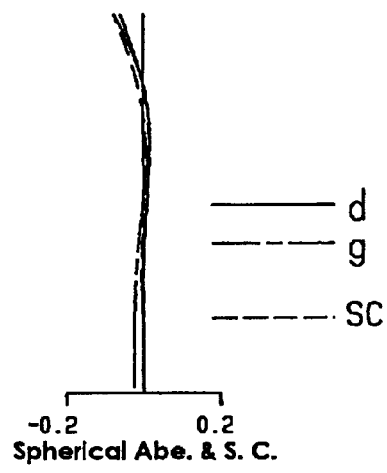
Figure 6E:
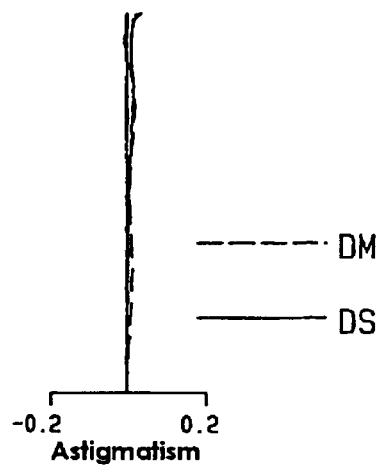
Figure 6F:
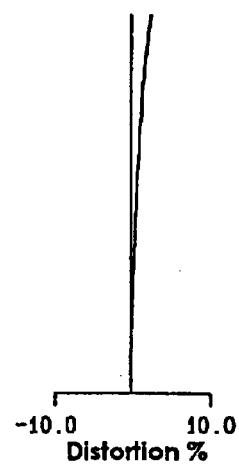
Figure 6G:
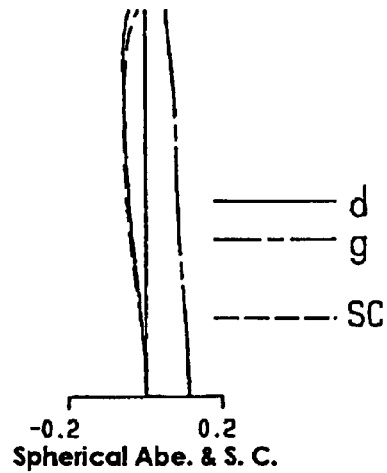
Figure 6H:
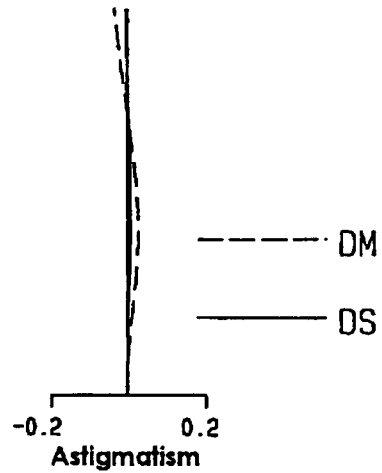
Figure 6I:
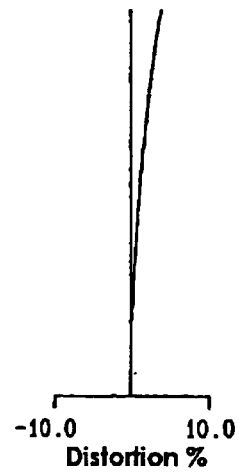
Figure 7A:
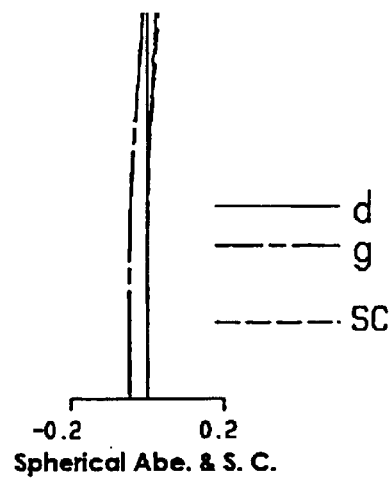
FIGS. 7A to 7I are graphic representations of aberrations of the third embodiment in in-focus state at infinity.
Figure 7B:
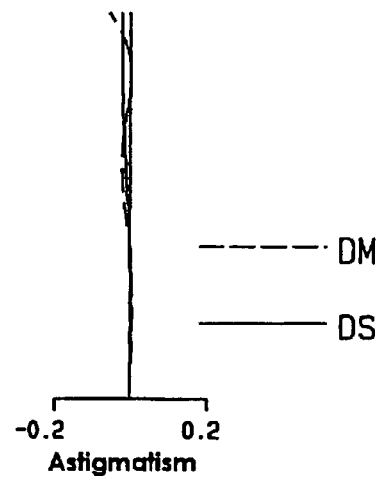
Figure 7C:
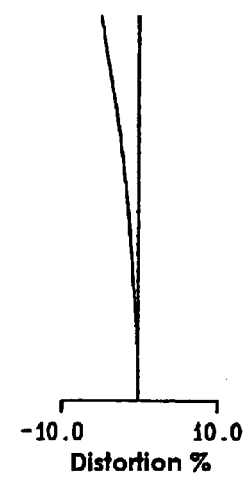
Figure 7D:
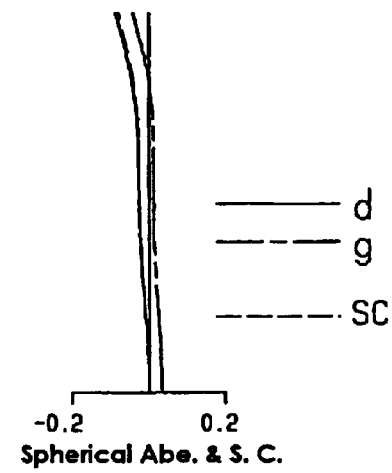
Figure 7E:
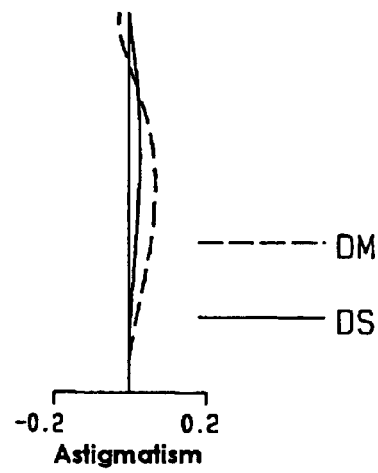
Figure 7F:
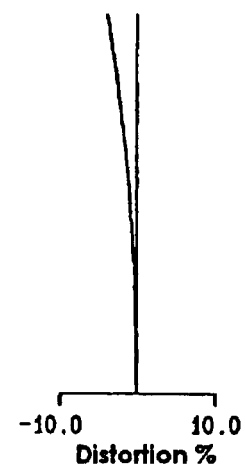
Figure 7G:
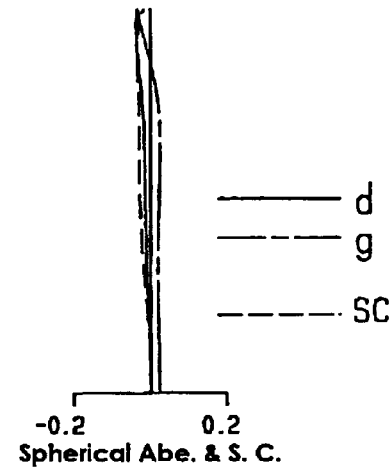
Figure 7H:
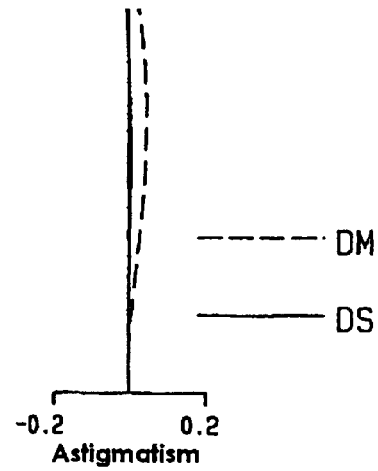
Figure 7I:
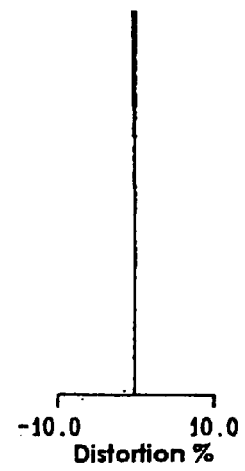
Figure 8A:
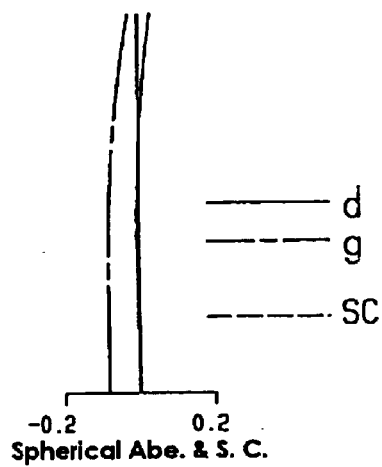
FIGS. 8A to 8I are graphic representations of aberrations of the fourth embodiment in in-focus state at infinity.
Figure 8B:
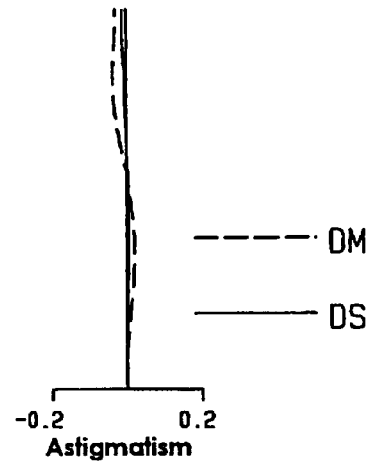
Figure 8C:
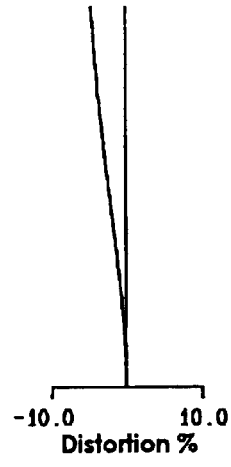
Figure 8D:
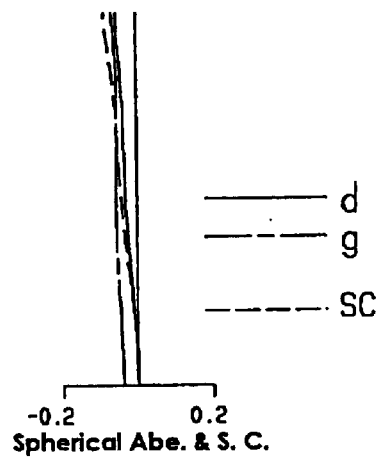
Figure 8E:
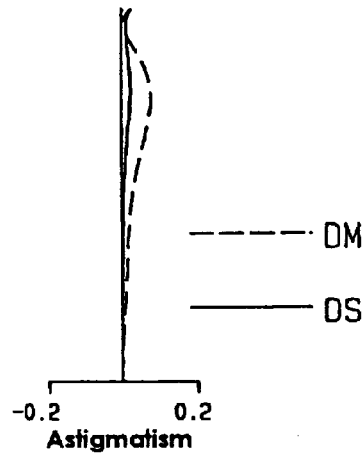
Figure 8F:
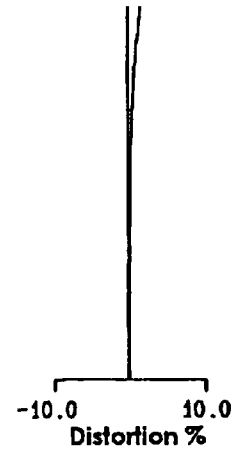
Figure 8G:
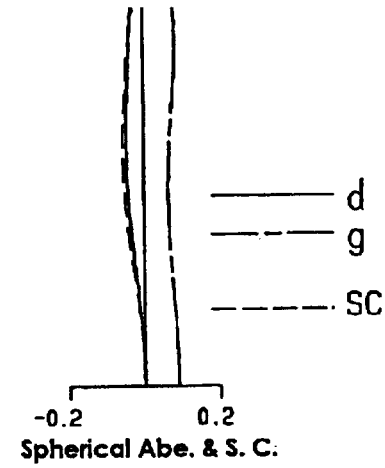
Figure 8H:
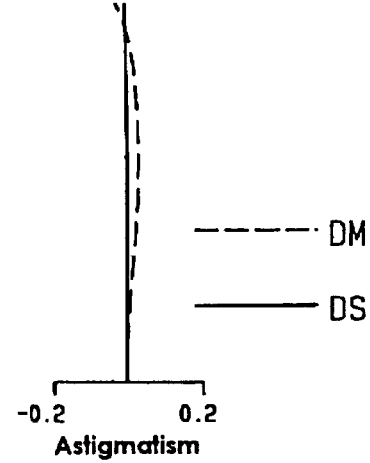
Figure 8I:
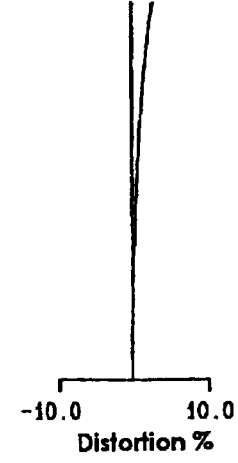

Referring to the drawings, an embodiment of the present invention will be described.

Figure 9:
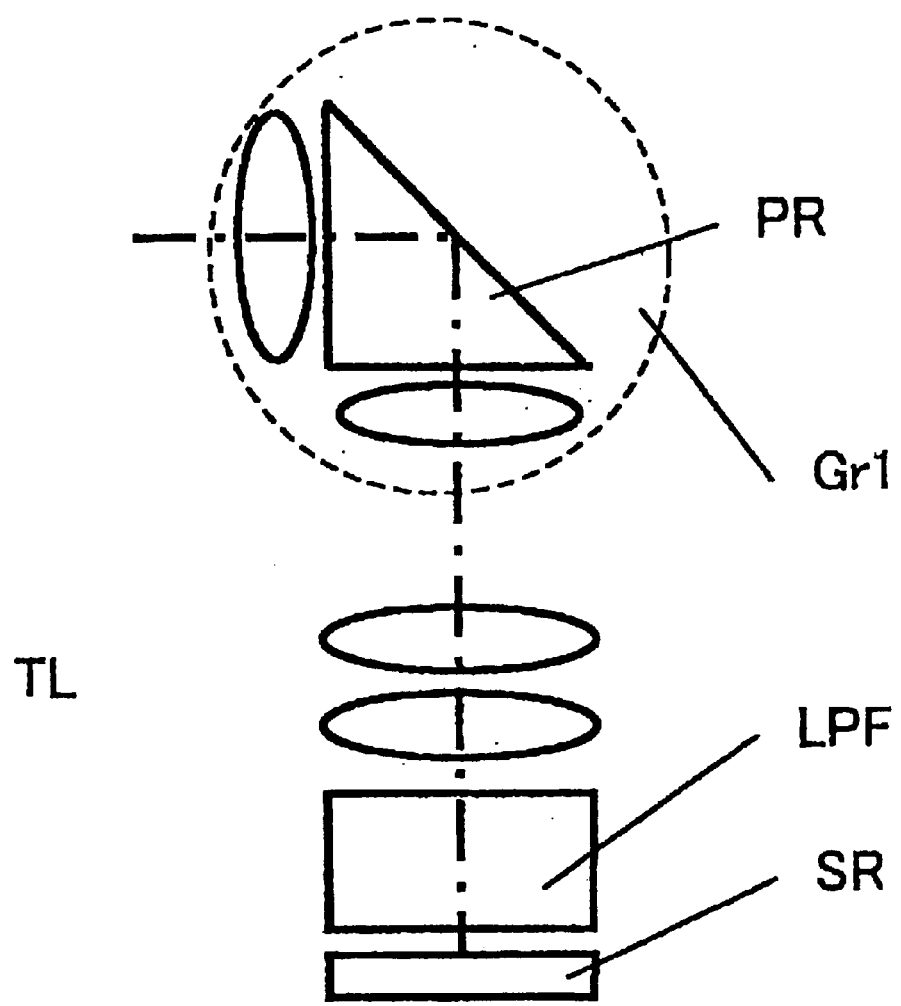
FIG. 9 is a construction view showing the present invention in outline.

An imaging device according to the embodiment of the present invention comprises, for example as shown in FIG. 9, from the object side (subject side): a zoom lens system TL forming an optical image of an object so as to zoom, an optical low-pass filter LPF, and an image sensor SR converting the optical image formed by the zoom lens system TL to electric signals. The zoom lens system comprises a first lens unit Gr1 including a prism PR having a reflecting surface inside, and succeeding lens units. The imaging device is a principal element of cameras incorporated in or externally attached to digital cameras, video cameras, personal computers, mobile computers, mobile telephones, PDAs and the like.

The zoom lens system TL comprises a plurality of lens units including the first lens unit Gr1. The size of the optical image can be varied by varying the distances between the lens units. The first lens unit Gr1 has a negative optical power, and includes the prism PR that bends the optical axis of the object light substantially 90 degrees.

The optical low-pass filter LPF has a specific cutoff frequency for adjusting the spatial frequency characteristics of the taking lens system to thereby eliminate the color moire generated in the image sensor. The optical low-pass filter of the embodiment is a birefringent low-pass filter formed by laminating a birefringent material such as crystal having its crystallographic axis adjusted in a predetermined direction, wave plates changing the plane of polarization, or the like. As the optical low-pass filter, a phase low-pass filter or the like may be adopted that attains necessary optical cutoff frequency characteristics by a diffraction effect.

The image sensor SR comprises a CCD having a plurality of pixels, and converts the optical image formed by the zoom lens system to electric signals by the CCD. The signals generated by the image sensor SR undergo predetermined digital image processing or image compression processing as required, and are recorded into a memory (a semiconductor memory, an optical disk, etc.) as digital video signals or in some cases, transferred to another apparatus through a cable or by being converted to infrared signals. A CMOS sensor may be used instead of a CCD.

FIGS. 1 to 4 are construction views showing the lens arrangements, in the shortest focal length condition, of the zoom lens systems included in imaging devices according to a first to a fourth embodiment of the present invention. In these figures, the prism PR having an internal reflection surface is illustrated as a plane-parallel plate, and the optical path is illustrated as a straight line.

A zoom lens system of the first embodiment comprises from the object side to the image side: a first lens unit Gr1 including a first lens element L1 being a negative meniscus lens element convex to the object side, a plate PR corresponding to the prism, a second lens element L2 of a negative meniscus configuration convex to the object side, and a third lens element L3 of a positive meniscus configuration convex to the object side; a diaphragm ST; a second lens unit Gr2 including a first doublet lens element DL1 consisting of a fourth lens element L4 of a bi-convex configuration and a fifth lens element L5 of a biconcave configuration; a third lens unit Gr3 including a sixth lens element L6 of a negative meniscus configuration concave to the object side; and a fourth lens unit Gr4 including a seventh lens element L7 of a negative meniscus configuration concave to the object side. On the image side of the fourth lens unit Gr4 of this zoom lens system, a plane-parallel plate LPF corresponding to the optical low-pass filter is disposed.

In this zoom lens system, in zooming from the shortest focal length condition to the longest focal length condition, the fist lens unit Gr1 moves so as to draw a locus of a U-turn convex to the image side such that it first moves toward the image side and then moves toward the object side, the second lens unit Gr2 substantially monotonously moves toward the object side integrally with the diaphragm ST disposed on the object side of the second lens unit Gr2, the third lens unit Gr3 substantially monotonously moves toward the image side, and the fourth lens unit Gr4 is fixed with respect to the image plane together with the plane-parallel plate LPF.

Of the surfaces of the lens elements, both side surfaces of the second lens element L2, the image side surface of the fifth lens element L5 and the object side surface of the sixth lens element L6 are aspherical.

A zoom lens system of the second embodiment comprises from the object side to the image side: a first lens unit Gr1 including a first lens element L1 of a bi-concave configuration and a plate PR corresponding to the prism; a second lens unit Gr2 including a second lens element L2 of a positive meniscus configuration convex to the object side and a third lens element L3 of a negative meniscus configuration convex to the object side; a diaphragm ST disposed between the second lens element L2 and the third lens element L3; a third lens unit Gr3 including a fourth lens element L4 of a bi-convex configuration; and a fourth lens unit Gr4 including a fifth lens element L5 of a negative meniscus configuration convex to the object side and a sixth lens element L6 of a bi-convex configuration. On the image side of the fourth lens unit Gr4 of this zoom lens system, a plane-parallel plate LPF corresponding to the optical low-pass filter is disposed.

In this zoom lens system, in zooming from the shortest focal length condition to the longest focal length condition, the first lens unit Gr1 is fixed with respect to the image plane, the second lens unit Gr2 substantially monotonously moves toward the object side, the third lens unit Gr3 substantially monotonously moves toward the object side integrally with the diaphragm ST, and the fourth lens unit Gr4 is fixed with respect to the image plane together with the plane-parallel plate LPF.

Of the surfaces of the lens elements, both side surfaces of the first lens element L1, the object side surface of the second lens element L2, both side surfaces of the third lens element L3 and the image side surface of the sixth lens element L6 are aspherical.

A zoom lens system of the third embodiment comprises from the object side to the image side: a first lens unit Gr1 including a first lens element L1 of a bi-concave configuration and a plate PR corresponding to the prism; a second lens unit Gr2 including a second lens element L2 of a positive meniscus configuration convex to the object side and a third lens element L3 of a negative meniscus configuration convex to the object side; a diaphragm ST disposed between the second lens element L2 and the third lens element L3; a third lens unit Gr3 including a fourth lens element L4 of a bi-convex configuration; and a fourth lens unit Gr4 including a fifth lens element L5 of a negative meniscus configuration concave to the object side and a sixth lens element L6 of a bi-convex configuration. On the image side of the fourth lens unit Gr4 of this zoom lens system, a plane-parallel plate LPF corresponding to the optical low-pass filter is disposed.

In this zoom lens system, in zooming from the shortest focal length condition to the longest focal length condition, the first lens unit Gr1 is fixed with respect to the image plane, the second lens unit Gr2 moves toward the object side integrally with the diaphragm ST so as to draw a locus convex to the object side, the third lens unit Gr3 substantially monotonously moves toward the object side, the fourth lens unit Gr4 substantially monotonously moves toward the object side, and the plane-parallel plate LPF is fixed with respect to the image plane.

Of the surfaces of the lens elements, both side surfaces of the first lens element L1, the object side surface of the second lens element L2, both side surfaces of the third lens unit L3 and the image side surface of the sixth lens element L6 are aspherical.

A zoom lens system of the fourth embodiment comprises from the object side to the image side: a first lens unit Gr1 including a first lens element L1 of a bi-concave configuration and a plate PR corresponding to the prism; a second lens unit Gr2 including a second lens element L2 of a positive meniscus configuration convex to the object side; a diaphragm ST; a third lens unit Gr3 including a third lens element L3 of a negative meniscus configuration convex to the object side; a fourth lens unit Gr4 including a fourth lens element L4 of a bi-convex configuration; and a fifth lens unit Gr5 including a fifth lens element L5 of a negative meniscus configuration convex to the object side and a sixth lens element L6 of a positive meniscus configuration convex to the object side. On the image side of the fifth lens unit Gr5 of this zoom lens system, a plane-parallel plate LPF corresponding to the optical low-pass filter is disposed.

In this zoom lens system, in zooming from the shortest focal length condition to the longest focal length condition, the first lens unit Gr1 is fixed with respect to the image plane, the second lens unit Gr2 moves toward the object side integrally with the diaphragm ST so as to draw a locus convex to the object side, the third lens unit Gr3 substantially monotonously moves toward the object side, the fourth lens unit Gr4 substantially monotonously moves toward the object side, and the fifth lens unit Gr5 is fixed with respect to the image plane together with the plane-parallel plate LPF.

Of the surfaces of the lens elements, both side surfaces of the first lens element L1, the object side surface of the second lens element L2, both side surfaces of the third lens element L3 and the image side surfaces of the sixth lens element L6 are aspherical.

In the zoom lens systems of these embodiments, the prism PR having a reflecting surface that bends the optical axis of the object light substantially 90 degrees is provided in the first lens unit. By thus bending the optical axis of the object light substantially 90 degrees, the apparent thickness of the imaging device can be reduced.

When a digital camera is taken as an example, the element that takes up the largest volume in the apparatus is the imaging device including the zoom lens system. Particularly, when in digital cameras, optical elements such as lens elements and a diaphragm included in the zoom lens system are arranged in line without the direction of the optical axis being changed like in conventional lens-shutter type film-based cameras, the size of the camera in the direction of the thickness substantially depends on the distance from the most object side element of the zoom lens system to the image sensor included in the imaging device. However, the aberration correction level of imaging devices have dramatically improved with the increase in the number of pixels of image sensors in recent years.

Consequently, the number of lens elements of the zoom lens systems included in imaging devices never stop increasing, so that because of the thickness of the lens elements, it is difficult to reduce the thickness even when the camera is not used (in so-called collapsed condition).

On the contrary, by adopting the structure that the optical axis of the object light is bent substantially 90 degrees by the reflecting surface like the zoom lens systems of the embodiments, the size of the imaging device in the direction of the thickness can be reduced to the distance from the most object side lens element to the reflecting surface when the camera is not used, so that the apparent thickness of the imaging device can be reduced. Moreover, by adopting the structure that the optical axis of the object light substantially 90 degrees by the reflecting surface, the optical path of the object light can be folded in the vicinity of the reflecting surface, so that space can be effectively used and further size reduction of the imaging device can be attained.

It is desirable that the reflecting surface be disposed in the first lens unit Gr1. By disposing the reflecting surface in the first lens unit Gr1 disposed on the most object side, the size of the imaging device in the direction of the thickness can be minimized.

It is desirable that the first lens unit Gr1 including the reflecting surface have a negative optical power. By the first lens unit Gr1 having a negative optical power, the size of the reflecting surface in the reflecting surface position can be reduced. Moreover, by adopting the structure that the first lens unit Gr1 has a negative optical power, the zoom lens system is of a so-called minus lead type. Minus lead type zoom lens systems are desirable because it is easy for them to adopt a retrofocus type structure in a wide focal length range and attain the image-side telecentricity necessary for optical systems for forming optical images on the image sensor.

While any of (a) an internal reflection prism (embodiments), (b) a surface reflection prism, (c) an internal reflection plane mirror and (d) a surface reflection mirror may be adopted as the reflecting surface, (a) an internal reflection mirror is the most suitable. By adopting an internal reflection prism, the object light passes through the medium of the prism, so that the axial distance when the object light passes through the prism is a reduced axial distance shorter than the normal air distance in accordance with the refractive index of the medium. For this reason, it is desirable that an internal reflection prism be adopted as the structure of the reflecting surface because an optically equivalent structure can be attained with a smaller space.

When the reflecting surface is an internal reflection prism, it is desirable that the material of the prism satisfy the following condition:

$$Np \geq 1.55 \qquad (1)$$

where Np is the refractive index of the material of the prism.

When the refractive index of the prism be lower than this range, the contribution to size reduction is small. Therefore, it is undesirable that the refractive index of the prism be lower than this range.

In addition to this range, it is desirable that the refractive index be within the following range:

$$Np \geq 1.7 \qquad (1)'$$

The reflecting surface is not necessarily a complete total reflection surface. The reflectance of part of the reflecting surface may be appropriately adjusted so that part of the object light branches off so as to be incident on a sensor for metering or distance measurement. Moreover, the reflectance of the entire area of the reflecting surface may be appropriately adjusted so that the finder light branches. While the incident surface and the exit surface of the prism are both plane in the embodiments, they may have an optical power.

It is desirable that not more than two lens elements be disposed on the object side of the reflecting surface. In a structure having in the first lens unit the prism PR having a reflecting surface that bends the optical axis of the object light substantially 90 degrees, the thickness of the optical system substantially depends on the distance from the object side surface of the lens element disposed on the most object side to the reflecting surface. Therefore, by disposing not more than two lens elements on the object side of the reflecting surface, a thin optical system can be obtained. In particular, when the first lens unit Gr1 includes only one lens element and the reflecting surface, the degree of freedom of the lens barrel structure can be increased, so that cost reduction of the imaging device can be attained. When the first lens unit Gr1 includes only two lens elements and the reflecting surface, relative decentration aberration correction can be performed, which is advantageous in optical performance.

Further, it is desirable that the first lens unit Gr1 be fixed with respect to the image plane during zooming. Since the first lens unit Gr1 includes the reflecting surface, moving it requires a large space, and in particular, when the reflecting surface comprises a prism, it is necessary to move a prism having a large weight, so that a heavy burden is placed on the driving mechanism. Moreover, by the first lens unit Gr1 being fixed with respect to the image plane during zooming, an optical system whose overall length does not vary can be obtained. Moreover, since the lens barrel structure can be simplified, cost reduction of the imaging device can be attained. Further, by adopting the structure that the first lens unit Gr1 is fixed during zooming, particularly in digital cameras, it is easy to initialize the control system for controlling the lens units movable during zooming, so that the time necessary for the camera to become ready to photograph when the main power is turned on can be reduced.

The zoom lens systems of the embodiments adopt a structure that the second lens unit Gr2 succeeding the first lens unit Gr1 having a negative optical power also has a negative optical power. This structure is desirable because it makes it easy to adopt the above-mentioned structure that the first lens unit Gr1 is fixed.

It is desirable that the zoom lens systems of the embodiments satisfy the following condition:

$$2 < |f1/fw| < 4 \qquad (2)$$

where f1 is the focal length of the first lens unit and fw is the overall focal length of the lens system in the shortest focal length condition.

The condition (2) defines the desirable focal length of the first lens unit Gr1. When the upper limit of the condition (2) is exceeded, since the focal length of the first lens unit Gr1 is too long, the overall length or the distance from the reflecting surface to the image sensor cannot be reduced. In addition, since the negative optical power of the first lens unit Gr1 is too weak, the outside diameter of the lens elements of the first lens unit Gr1 increases, so that a compact zoom lens system cannot be attained. When the lower limit of the condition (2) is exceeded, since the focal length of the first lens unit Gr1 is too short, the negative distortion generated in the first lens unit Gr1 is too large in the shortest focal length condition, so that it is difficult to correct it.

It is preferable that zoom lens system satisfy the following condition (3):

$$1.0 < D/fw < 2.6 \qquad (3)$$

where D represents an axial distance between surface at the most object side surface of the first lens unit and reflection surface; and fw represents a focal length of the entire zoom lens system in a wide angle condition.

The condition (3) defines the preferable relation the axial distance between surface at the most object side surface of the first lens unit and reflection surface. This condition (3) is required to miniaturize the entire optical system having reflection surface. If the lower limit of condition (3) were be transgressed, the optical power of the lens elements at the object side of the reflection surface would be too strong. This would cause a distortion so large (especially the negative distortion on the wide-angle end) that it would be impossible to secure satisfactory optical performance. By contrast, if the upper limit of condition (3) were to be transgressed, the axial distance between surface at the most object side surface of the first lens unit and reflection surface would be too long, which is undesirable in term of miniaturization. In addition to the above-mentioned range, it is preferable that the following range (3)' is filfilled:

$$D/fw < 2.2 \qquad (3)'$$

While the lens units of the embodiments comprise only refractive type lens elements that deflect the incident ray by refraction (that is, lens elements of a type in which the incident ray is deflected at the interface between media having different refractive indices), the present invention is not limited thereto. For example, the lens units may comprise diffractive type lens elements that deflect the incident ray by diffraction, refractive-diffractive hybrid lens elements that deflect the incident ray by a combination of diffraction and refraction, or gradient index lens elements that deflect the incident ray by the distribution of refractive index in the medium.

The construction of the zoom lens systems included in the imaging device embodying the present invention will be more concretely described with reference to construction data, graphic representations of aberrations and the like. A first to a fourth example described here as examples corresponds to the first to the fourth embodiments described above. The lens construction views (FIGS. 1 to 4) showing the first to the fourth embodiments show the lens arrangements of the corresponding first to fourth examples.

In the construction data of the examples, ri (i=1,2,3, . . . ) is the radius (mm) of curvature of the i-th surface counted from the object side, di (i=1,2,3, . . . ) is the i-th axial distance (mm) counted from the object side, and Ni (i=1,2,3, . . . ) and vi (i=1,2,3, . . . ) are the refractive index (Nd) and the Abbe number (vd), to the d-line, of the i-th optical element counted from the object side. In the construction data, as the axial distances that vary during zooming, values in the shortest focal length condition (wide-angle limit, W), in the middle focal length condition (middle, M) and in the longest focal length condition (telephoto limit, T) are shown. The overall focal lengths (f, mm) and the f-numbers (FNO) in the focal length conditions (W), (M) and (T) are shown together with other data.

The surfaces whose radii of curvature ri are marked with asterisks are aspherical, and are defined by the following expression (AS) expressing the aspherical surface configuration. Asperical data of the embodiments is shown as well.

$$x = \frac{C_0 y^2}{1 + \sqrt{1 - \varepsilon C_0^2 y^2}} + \sum A i y^j \tag{AS}$$

where, x represents the shape (mm) of the aspherical surface (i.e., the displacement along the optical axis at the height y in a direction perpendicular to the optical axis of the aspherical surface), Co represents the curvature ($mm^{-1}$) of the reference aspherical surface of the aspherical surface, y represents the height in a direction perpendicular to the optical axis, $\varepsilon$ represents the quadric surface parameter, and Ai represents the aspherical coefficient of order i.

Example 1
f = 5.1 – 8.9 – 14.7
Fno. = 2.24 – 2.98 – 4.10

| [Radius of Curvature] | [Axial Distance] | [Refractive Index (Nd)] | [Abbe Number (vd)] |
|---|---|---|---|
| r1* = 17.487 | d1 = 1.000 | N1 = 1.733922 | v1 = 29.35 |
| r2 = 10.704 | d2 = 3.877 | | |
| r3 = ∞ | d3 = 12.400 | N2 = 1.84666 | v2 = 23.82 |
| r4 = ∞ | d4 = 1.500 | | |
| r5* = 213.855 | d5 = 1.000 | N3 = 1.61203 | v3 = 52.33 |
| r6* = 5.360 | d6 = 1.317 | | |
| r7 = 9.257 | d7 = 1.649 | N4 = 1.84666 | v4 = 23.82 |
| r8 = 23.872 | d8 = 12.037 – 4.771 – 1.000 | | |
| r9 = ∞ | d9 = 0.600 | | |
| r10 = 6.464 | d10 = 6.219 | N5 = 1.75450 | v5 = 51.57 |
| r11 = –7.306 | d11 = 1.000 | N6 = 1.84666 | v6 = 23.82 |
| r12* = 33.980 | d12 = 2.038 – 7.101 – 13.534 | | |
| r13* = –17.735 | d13 = 3.475 | N7 = 1.52510 | v7 = 56.38 |
| r14 = –5.800 | d14 = 2.546 – 1.749 – 0.500 | | |
| r15 = –10.504 | d15 = 1.000 | N8 = 1.48749 | v8 = 70.44 |
| r16 = –32.714 | d16 = 0.109 | | |
| r17 = ∞ | d17 = 2.000 | N9 = 1.51680 | v9 = 64.20 |
| r18 = ∞ | | | |

[Aspherical Coefficient]
r5*
$\varepsilon$ = 0.10000000E+01
A4 = –0.17088362E–03
A6 = –0.59468528E–06
A8 = 0.17670065E–06
A10 = –0.21232398E–09
r6*
$\varepsilon$ = 0.10000000E+01
A4 = –0.78520204E–03
A6 = –0.18852025E–04
A8 = –0.22264586E–06
A10 = 0.62844746E–08
r13*
$\varepsilon$ = 0.10000000E+01
A4 = 0.12126439E–02
A6 = 0.68930495E–04
A8 = –0.29394404E–05
A10 = 0.46789735E–06
r14*
$\varepsilon$ = 0.10000000E+01
A4 = –0.16889906E–02
A6 = 0.41032113E–04
A8 = –0.67973071E–05
A10 = 0.22276351E–06

Example 2
f = 5.8 – 11.6 – 16.7
Fno. = 3.60 – 3.60 – 3.66

| [Radius of Curvature] | [Axial Distance] | [Refractive Index (Nd)] | [Abbe Number (vd)] |
|---|---|---|---|
| r1* = −11.725 | d1 = 1.200 | N1 = 1.49310 | v1 = 83.58 |
| r2* = 13.872 | d2 = 1.410 | | |
| r3 = ∞ | d3 = 7.000 | N2 = 1.84666 | v2 = 23.82 |
| r4 = ∞ | d4 = 22.033 – 8.278 – 0.600 | | |
| r5 = 6.671 | d5 = 2.562 | N3 = 1.75450 | v3 = 51.57 |
| r6 = 35.072 | d6 = 0.600 | | |
| r7 = ∞ | d7 = 0.600 | | |
| r8* = 18.236 | d8 = 0.800 | N4 = 1.84666 | v4 = 23.82 |
| r9* = 8.198 | d9 = 7.034 – 16.244 – 14.414 | | |
| r10 = 39.487 | d10 = 2.334 | N5 = 1.49310 | v5 = 83.58 |
| r11 = −13.184 | d11 = 3.125 – 7.669 – 17.177 | | |
| r12 = 21.757 | d12 = 0.800 | N6 = 1.84666 | v6 = 23.82 |
| r13 = 9.428 | d13 = 0.175 | | |
| r14 = 10.828 | d14 = 2.272 | N7 = 1.50467 | v7 = 59.44 |
| r15* = −70.639 | d15 = 1.665 | | |
| r16 = ∞ | d16 = 2.000 | N8 = 1.51680 | v8 = 64.20 |
| r17 = ∞ | | | |

[Aspherical Coefficient]
r1*
$\epsilon$ = 0.10000E+01
A4 = 0.39770E−03
A6 = 0.48251E−05
A8 = −0.13574E−06
A10 = 0.82447E−09
r2*
$\epsilon$ = 0.10000E+01
A4 = 0.12088E−03
A6 = 0.37656E−05
A8 = 0.23199E−06
A10 = −0.73492E−08
r8*
$\epsilon$ = 0.10000E+01
A4 = 0.53711E−03
A6 = 0.22090E−04
A8 = −0.48503E−05
A10 = 0.21033E−06
r9*
$\epsilon$ = 0.10000E+01
A4 = 0.14617E−02
A6 = 0.84785E−04
A8 = −0.97230E−05
A10 = 0.62378E=06
r15*
$\epsilon$ = 0.10000E+01
A4 = 0.11315E−02
A6 = −0.58783E−04
A8 = 0.63291E−05
A10 = −0.18581E−06

Example 3
f = 6.0 – 12.0 – 17.3
Fno. = 3.60 – 3.60 – 3.60

| [Radius of Curvature] | [Axial Distance] | [Refractive Index (Nd)] | [Abbe Number (vd)] |
|---|---|---|---|
| r1* = −72.486 | d1 = 1.200 | N1 = 1.49310 | v1 = 83.58 |
| r2* = 8.054 | d2 = 2.476 | | |
| r3 = ∞ | d3 = 9.000 | N2 = 1.84666 | v2 = 23.82 |
| r4 = ∞ | d4 = 21.244 – 4.060 – 0.600 | | |
| r5 = 6.766 | d5 = 2.652 | N3 = 1.79719 | v3 = 45.34 |
| r6 = 17.430 | d6 = 1.000 | | |
| r7 = ∞ | d7 = 0.686 | | |
| r8* = 93.830 | d8 = 0.800 | N4 = 1.84666 | v4 = 23.82 |
| r9* = 12.440 | d9 = 3.714 – 12.381 – 9.898 | | |
| r10 = 22.538 | d10 = 2.473 | N5 = 1.49310 | v5 = 83.58 |
| r11 = −15.873 | d11 = 1.500 – 9.644 – 21.642 | | |
| r12 = −11.841 | d12 = 0.800 | N6 = 1.84666 | v6 = 23.82 |
| r13 = −27.408 | d13 = 0.100 | | |

-continued

Example 3
f = 6.0 – 12.0 – 17.3
Fno. = 3.60 – 3.60 – 3.60

| [Radius of Curvature] | [Axial Distance] | [Refractive Index (Nd)] | [Abbe Number (vd)] |
|---|---|---|---|
| r14 = 16.037 | d14 = 2.349 | N7 = 1.72904 | v7 = 52.47 |
| r15* = −57.477 | d15 = 6.683 – 7.055 – 1.000 | | |
| r16 = ∞ | d16 = 2.000 | N8 = 1.51680 | v8 = 64.20 |
| r17 = ∞ | | | |

[Aspherical Coefficient]
r1*
$\epsilon$ = 0.10000E+01
A4 = −0.24017E−05
A6 = 0.29455E−05
A8 = −0.30412E−07
A10 = 0.12502E−10
r2*
$\epsilon$ = 0.10000E+01
A4 = −0.18797E−03
A6 = −0.38877E−05
A8 = 0.34374E−06
A10 = −0.63589E−08
r8*
$\epsilon$ = 0.10000E+01
A4 = 0.58124E−03
A6 = 0.33012E−04
A8 = −0.45331E−05
A10 = 0.17297E−06
r9*
$\epsilon$ = 0.10000E+01
A4 = 0.13667E−02
A6 = 0.79666E−04
A8 = −0.97230E−05
A10 = −0.77035E=05
r15*
$\epsilon$ = 0.10000E+01
A4 = 0.63869E−04
A6 = −0.71764E−04
A8 = 0.36999E−05
A10 = −0.66315E−06

Example 4
f = 5.8 – 11.6 – 16.7
Fno. = 3.60 – 3.60 – 3.60

| [Radius of Curvature] | [Axial Distance] | [Refractive Index (Nd)] | [Abbe Number (vd)] |
|---|---|---|---|
| r1* = −14.542 | d1 = 1.200 | N1 = 1.49310 | v1 = 83.58 |
| r2* = 12.397 | d2 = 1.494 | | |
| r3 = ∞ | d3 = 7.000 | N2 = 1.84666 | v2 = 23.82 |
| r4 = ∞ | d4 = 22.039 – 8.570 – 0.600 | | |
| r5* = 7.238 | d5 = 2.651 | N3 = 1.71300 | v3 = 53.93 |
| r6 = 48.781 | d6 = 0.677 | | |
| r7 = ∞ | d7 = 0.600 – 0.931 – 1.000 | | |
| r8* = 25.723 | d8 = 0.805 | N4 = 1.84666 | v4 = 23.82 |
| r9* = 10.714 | d9 = 6.475 – 16.205 – 14.774 | | |
| r10 = 42.281 | d10 = 2.322 | N5 = 1.49310 | v5 = 83.58 |
| r11 = −13.537 | d11 = 4.243 – 7.651 – 16.983 | | |
| r12 = 19.872 | d12 = 0.800 | N6 = 1.84666 | v6 = 23.82 |
| r13 = 8.858 | d13 = 0.100 | | |
| r14 = 6.329 | d14 = 2.301 | N7 = 1.48749 | v7 = 70.44 |
| r15* = 16.784 | d15 = 0.996 | | |
| r16 = ∞ | d16 = 2.000 | N8 = 1.51680 | v2 = 64.20 |
| r17 = ∞ | | | |

[Aspherical Coefficient]
r1*
$\epsilon$ = 0.10000E+01
A4 = 0.31440E−03
A6 = 0.40741E−05
A8 = −0.13254E−06
A10 = 0.88372E−09
r2*

-continued

Example 4
f = 5.8 – 11.6 – 16.7
Fno. = 3.60 – 3.60 – 3.60

[Radius of Curvature]  [Axial Distance]  [Refractive Index (Nd)]  [Abbe Number (vd)]

$\epsilon$ = 0.10000E+01
A4 = –0.14549E–03
A6 = –0.90366E–05
A8 = 0.23593E–06
A10 = –0.68590E–08
r8*
$\epsilon$ = 0.10000E+01
A4 = 0.60518E–03
A6 = 0.22274E–04
A8 = –0.54357E–05
A10 = 0.24817E–06
r9*
$\epsilon$ = 0.10000E+01
A4 = 0.13444E–02
A6 = 0.68972E–04
A8 = –0.94129E–05
A10 = –0.53475E=06
r15*
$\epsilon$ = 0.10000E+01
A4 = 0.12639E–02
A6 = –0.11077E–04
A8 = 0.48956E–05
A10 = –0.16001E–06

FIGS. 5A to 5I through 8A to 8I which are graphic representations of aberrations of the first to the fourth examples show aberrations of the zoom lens systems of the examples in in-focus state at infinity. In these figures, (W), (M) and (T) show aberrations (from the left, spherical aberration, sine condition, astigmatism and distortion; Y'(mm) is the maximum image height [corresponding to the distance from the optical axis] on the image sensor) in the shortest focal length condition, in the middle focal length condition and in the longest focal length condition, respectively. In the graphic repesentations of spherical aberration, the solid line (d) shows spherical aberration to the d-line, the chain line (g) shows spherical aberration to the g-line, the chain double-dashed line (c) shows spherical aberration to the c-line, and the broken line (SC) shows sine condition. In the graphic representations of astigmatism, the broken line (DM) shows astigmatism on the meridional image plane, and the solid line (DS) shows astigmatism on the sagittal image plane. In the graphic representations of distortion, the solid line shows distortion % to the d-line.

As described above, according to the zoom lens systems of the embodiments, an imaging device can be provided that is compact although having a high-performance and high-magnification zoom lens system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An imaging device comprising:
   a zoom lens system having a plurality of lens units and forming an optical image of an object so as to continuously optically zoom by varying distances between the lens units; and
   an image sensor converting the optical image formed by the zoom lens system to an electric signal,
   wherein the zoom lens system comprises, from an object side:
   a first lens unit being overall negative and including a reflecting surface that bends a luminous flux substantially 90 degrees; and
   a second lens unit disposed with a variable air distance from the first lens unit, and having a positive optical power, and
   wherein the zoom lens system fulfills the following condition:

$$2<|f1/fw|<4$$

where f1 is a focal length of the first lens unit and fw is an overall focal length of the zoom lens system in a shortest focal length condition.

2. An imaging device as claimed in claim 1, wherein the first lens unit includes a right-angle prism having an internal reflecting surface as the reflecting surface.

3. An imaging device as claimed in claim 2, wherein the following condition is satisfied:

$$Np \geq 1.55$$

where Np is a refractive index to a d-line of the right-angle prism.

4. An imaging device as claimed in claim 1, the zoom lens system further comprises,
   a third lens unit disposed with a variable air distance from the second lens unit, and having a positive optical power.

5. An imaging device as claimed in claim 1, wherein, the first lens unit is fixed with respect to the image plane in zooming from the shortest focal length condition to the longest focal length condition.

6. An imaging device as claimed in claim 1, wherein, the first lens unit moves so as to draw a locus of a U-turn convex to the image side in zooming from the shortest focal length condition to the longest focal length condition.

7. An imaging device as claimed in claim 1, wherein the zoom lens system has not more than two lens elements disposed on the object side of the reflecting surface.

8. An imaging device as claimed in claim 7, wherein the zoom lens system has only one lens element disposed on the object side of the reflecting surface.

9. An imaging device as claimed in claim 1, wherein the zoom lens system fulfills the following condition:

$$1.0 < D/fw < 2.6$$

where D represents an axial distance between a surface at the most object side surface of the first lens unit and the reflecting surface; and fw represents a focal length of the entire zoom lens system in a wide angle condition.

10. A camera comprising:
    an imaging device having a zoom lens system a plurality of lens units and forming an optical image of an object so as to continuously optically zoom by varying distances between the lens units and an image sensor converting the optical image formed by the zoom lens system to an electric signal,
    wherein the zoom lens system comprises from an object side:
        a first lens unit being overall negative and including a reflecting surface that bends a luminous flux substantially 90 degrees; and
        a second lens unit disposed with a variable air distance from the first lens unit, and having a positive optical power, and
    wherein the zoom lens system fulfills the following condition:

$$2 < |f1/fw| < 4$$

where f1 is a focal length of the first lens unit and fw is an overall focal length of the zoom lens system in a shortest focal length condition.

11. A camera as claimed in claim 10, wherein the first lens unit includes a right-angle prism having an internal reflecting surface as the reflecting surface.

12. A camera as claimed in claim 10, wherein the following condition is satisfied:

$$Np \geq 1.55$$

where Np is a refractive index to a d-line of the right-angle prism.

13. A camera as claimed in claim 10, the zoom lens system further comprises,
    a third lens unit disposed with a variable air distance from the second lens unit, and having a positive optical power.

14. A camera as claimed in claim 10, wherein, the first lens unit is fixed with respect to the image plane in zooming from the shortest focal length condition to the longest focal length condition.

15. A camera as claimed in claim 10, wherein, the first lens unit moves so as to draw a locus of a U-turn convex to the image side in zooming from the shortest focal length condition to the longest focal length condition.

16. A camera as claimed in claim 10, wherein the zoom lens system has not more than two lens elements disposed on the object side of the reflecting surface.

17. A camera as claimed in claim 16, wherein the zoom lens system has only one lens element disposed on the object side of the reflecting surface.

18. A camera as claimed in claim 10, wherein the zoom lens system fulfills the following condition:

$$1.0 < D/fw < 2.6$$

where D represents an axial distance between a surface at the most object side surface of the first lens unit and the reflecting surface; and fw represents a focal length of the entire zoom lens system in a wide angle condition.

19. An imaging device comprising:
    a zoom lens system having a plurality of lens units and forming an optical image of an object so as to continuously optically zoom by varying distances between the lens units; and
    an image sensor converting the optical image formed by the zoom lens system to an electric signal,
    wherein the zoom lens system comprises, from an object side:
        a first lens unit being overall negative and including a reflecting surface that bends a luminous flux substantially 90 degrees; and
        a second lens unit disposed with a variable air distance from the first lens unit, and having a positive optical power, and
    wherein the zoom lens system fulfills the following condition:

$$1.0 < D/fw < 2.6$$

where D represents an axial distance between a surface at the most object side surface of the first lens unit and the reflecting surface and fw represents a focal length of the entire zoom lens system in a wide angle condition.

20. An imaging device as claimed in claim 19, wherein the first lens unit includes a right-angle prism having an internal reflecting surface as the reflecting surface.

21. An imaging device as claimed in claim 20, wherein the following condition is satisfied:

$$Np \geq 1.55$$

where Np is a refractive index to a d-line of the right-angle prism.

22. A camera comprising:
    an imaging device having a zoom lens system a plurality of lens units and forming an optical image of an object so as to continuously optically zoom by varying distances between the lens units and an image sensor converting the optical image formed by the zoom lens system to an electrical signal,
    wherein the zoom lens system comprises from an object side:
        a first lens unit being overall negative and including a reflecting surface that bends a luminous flux substantially 90 degrees; and
        a second lens unit disposed with a variable air distance from the first lens unit, and having a positive optical power, and
    wherein the zoom lens system fulfills the following condition:

$$1.0 < D/fw < 2.6$$

where D represents an axial distance between a surface at the most object side surface of the first lens unit and the reflecting surface and fw represents a focal length of the entire zoom lens system in a wide angle condition.

23. A camera as claimed in claim 22, wherein the first lens unit includes a right-angle prism having an internal reflecting surface as the reflecting surface.

24. A camera as claimed in claim 23, wherein the following condition is satisfied:

$$Np \geq 1.55$$

where Np is a refractive index to a d-line of the right-angle prism.

25. An imaging device comprising:
a zoom lens system having a plurality of lens units and forming an optical image of an object so as to continuously optically zoom by varying distances between the lens units; and
an image sensor converting the optical image formed by the zoom lens system to an electric signal,
wherein the zoom lens system comprisesm from an object side:
   a first lens unit being overall negative and including a right-angle prism having an internal reflecting surface that bends a luminous flux substantially 90 degrees, and
   a second lens unit disposed with a variable air distance from the first lens unit, and having a positive optical power.

26. An imaging device as claimed in claim 25, wherein the following condition is satisfied:

$$Np \geq 1.55$$

where Np is a refractive index to a d-line of the right-angle prism.

27. A camera comprising:
an imaging device having a zoom lens system a plurality of lens units and forming an optical image of an object so as to continuously optically zoom by varying distances between the lens units and an image sensor converting the optical image formed by the zoom lens system to an electric signal,
wherein the zoom lens system comprises from an object side:
   a first lens unit being overall negative and including a right-angle prism having an internal reflecting surface that bends a luminous flux substantially 90 degrees, and
   a second lens unit disposed with a variable air distance from the first lens unit, and having a positive optical power.

28. A camera as claimed in claim 27, wherein the following condition is satisfied:

$$Np \geq 1.55$$

where Np is a refractive index to a d-line of the right-angle prism.

* * * * *

UNITED STATES PATENT AND TRADEMARK OFFICE
CERTIFICATE OF CORRECTION

PATENT NO.    : 6,853,807 B2
DATED         : February 8, 2005
INVENTOR(S)   : Hitoshi Hagimori et al.

It is certified that error appears in the above-identified patent and that said Letters Patent is hereby corrected as shown below:

Column 8,
Lines 3 and 4, delete "also has a negtaive" and insert -- has a positive --.

Column 19,
Line 15, delete "comprisesm" and insert -- comprises, --.

Signed and Sealed this

Twenty-fourth Day of May, 2005

JON W. DUDAS
*Director of the United States Patent and Trademark Office*